July 4, 1939.  F. X. GOVERS  2,164,769
SOLVENT REFINING OF HYDROCARBON OIL
Filed Jan. 11, 1935
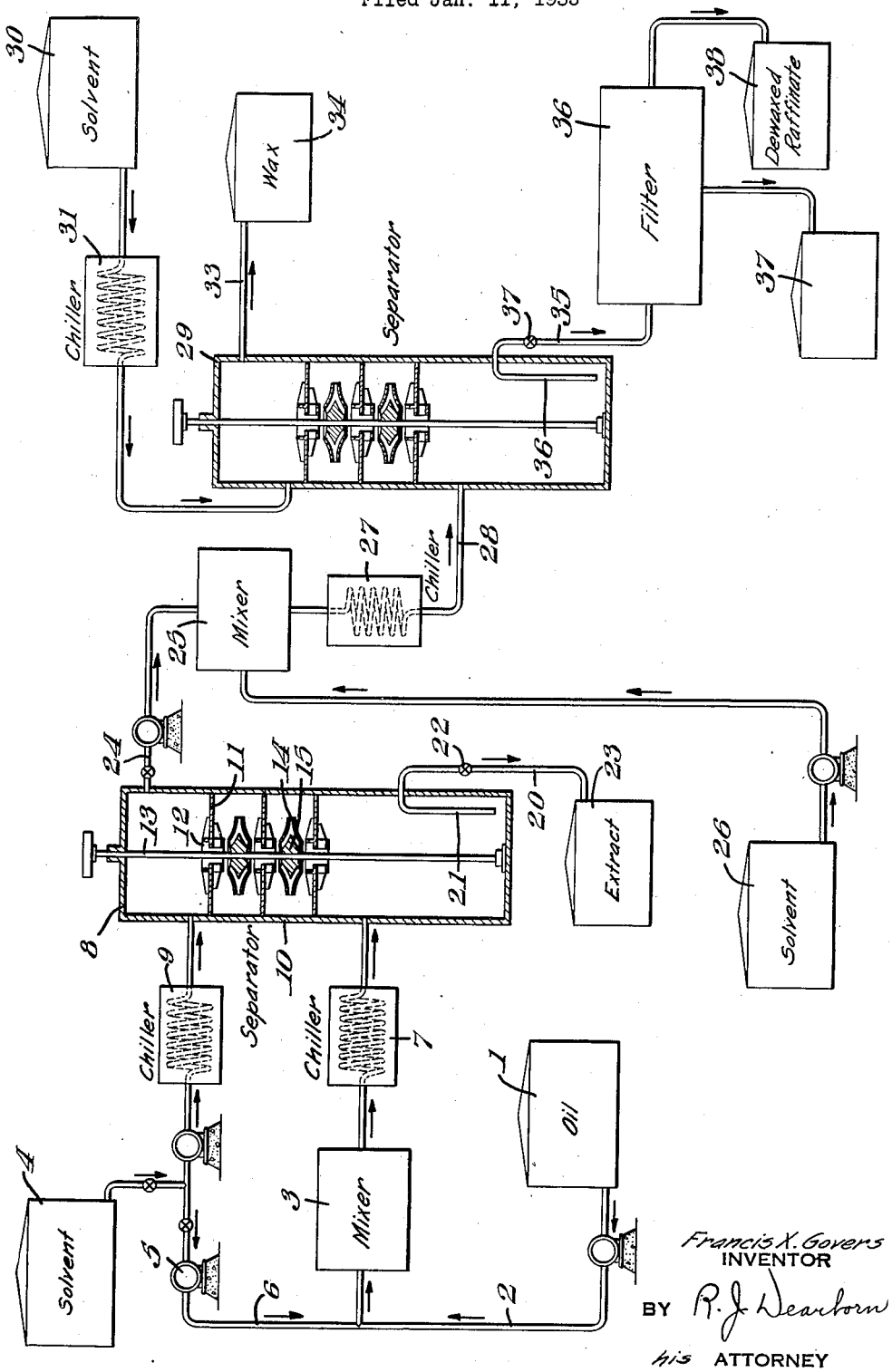
Francis X. Govers
INVENTOR
BY R. J. Dearborn
his ATTORNEY Patented July 4, 1939

2,164,769

UNITED STATES PATENT OFFICE 2,164,769

SOLVENT REFINING OF HYDROCARBON OIL

Francis X. Govers, Vincennes, Ind., assignor to Indian Refining Company, Lawrenceville, Ill., a corporation of Maine Application January 11, 1935, Serial No. 1,331

3 Claims. (Cl. 196—18)

This invention relates to the treatment of hydrocarbon oil, and particularly to a method of treating hydrocarbon oils, such as mineral oil, with selective solvents.

This invention broadly contemplates a process for refining hydrocarbon oil involving continuous countercurrent treatment of the oil with a selective solvent liquid adapted to separate the oil into its component parts. The invention is particularly adapted for manufacturing lubricating oil from wax-bearing mineral oil wherein the oil is extracted and dewaxed with selective solvent liquids to produce a low pour test lubricating oil product of relatively high viscosity index and possessing other desirable characteristics. The invention also contemplates a continuous method of dewaxing wax-bearing oil wherein the wax may be separated from the oil in a comparatively oil-free condition.

More specifically, the invention comprises effecting treatment of the oil with a selective solvent in a countercurrent operation employing a solvent having a specific gravity substantially different from that of the oil undergoing treatment and such that separation of the oil-solvent mixture into a dissolved or extract phase, and an undissolved or raffinate phase, is facilitated. The treatment of the oil with the solvent is carried out in apparatus which permits realizing improved and more rapid separation of the oil into the aforesaid extract and raffinate phases, respectively, and which also provides means for subjecting the constituents of the undissolved phase to an extremely effective washing action with fresh solvent so that a greater degree of separation is possible than has heretofore been realized.

I contemplate effecting countercurrent treatment of the oil with the solvent in an apparatus which advantageously comprises a closed vertical separating vessel. This separating vessel is provided with mixing means within its central portion adapted to subject the countercurrently moving oil and solvent to violent mixing therein. Provision is made both above and below this zone of violent mixing for settling to facilitate separation of the mixed oil and solvent into a light specific gravity phase accumulating in the top portion of the separating vessel, and a heavy specific gravity phase accumulating in the bottom thereof. The arrangement is such that the undissolved phase, composed of those constituents of the oil which are insoluble in the solvent under the conditions prevailing within the separating vessel, is washed with fresh incoming solvent in a manner such that the maximum extractive effect is realized.

This arrangement is of particular advantage as applied to the dewaxing of wax-bearing mineral oil. Due to the violent mixing and agitation to which the oil and solvent is subjected in the central portion of the separating vessel, the wax constituents are separated from the mixture in a very finely divided form. The wax is, therefore, in a condition which lends itself readily to effective washing for the removal of oil adhering to the particles of wax. The washing of this finely divided wax is accomplished in the settling portion of the separating vessel when the separated finely divided wax is caused to move through a countercurrently moving body of fresh solvent as will be more fully described later.

In the prior art methods of solvent dewaxing, the separated wax tends to retain a substantial quantity of oil. This invention, however, provides a simple method of dewaxing wherein the wax is separated from the mixture in a substantially oil-free condition. The invention has a still further advantage in that it provides a strictly continuous method of solvent dewaxing.

An example of a solvent which is particularly well adapted to the carrying out of the combined operations of extracting and dewaxing wax-bearing mineral oil by the process of my invention is one comprising a mixture of liquid sulphur dioxide and orthodichlorbenzene. Such a mixture has a heavy specific gravity relative to that of the oil undergoing treatment, and it also is of a relative non-viscous nature so that it readily permits separation of the mixture of oil and solvent into dissolved and undissolved phases. As will be explained later in more detail, where a mixture of the same solvent components is used in both the extracting and dewaxing operations, the proportion of the solvent components used in the extracting operation will vary from that used in the dewaxing operation.

Thus, in an extracting operation, where a mixture of sulphur dioxide and orthodichlorbenzene is used, the solvent liquid mixture is composed of about 70% liquid sulphur dioxide and 30% orthodichlorbenzene and which mixture has a specific gravity of about 1.39. In the dewaxing step, the proportions of each solvent component may be substantially reversed so that the orthodichlorbenzene is in the predominant proportion as, for example, about 70% orthodichlorbenzene and 30% sulphur dioxide. The solvent mixture of this latter composition has a specific gravity of around 1.34.

While the ortho form of dichlorbenzene has been referred to, it is contemplated that the meta form or mixtures containing the other isomeric forms of this compound may be used.

For example, mixtures of either sulphur dioxide and monochlorbenzene, or sulphur dioxide and dichlorbenzene, containing certain percentages of methyl ethyl ketone or methyl isobutyl ketone, may be employed to advantage since the presence of methyl ethyl ketone or methyl isobutyl ketone in these mixtures results in marked improvement in color and general characteristics of the lubricating oil product obtained.

It is also contemplated that solvent mixtures having a specific gravity lighter than that of the oil undergoing treatment may be employed. A mixture of ethyl ether and methyl ethyl ketone may be used for extracting oil in accordance with the method of my invention to effect separation of the mineral oil into fractions respectively rich in naphthenic and paraffinic constituents. Other solvent liquid mixtures which may be used in extracting oil in accordance with the method of my invention comprise mixtures of aniline with orthodichlorbenzene, aniline with ethyl ether, and also a mixture comprising two parts of furfural and one part of a mixture of equal parts of methyl ethyl ketone and amyl alcohol.

Where a solvent mixture of specific gravity heavier than the oil is used, such as the above mixtures of sulphur dioxide and orthodichlorbenzene, the solvent is introduced to the upper portion of the above mentioned separating vessel while the oil to be treated, either alone or mixed with some solvent, is introduced to the lower portion of the separating vessel. The body of oil, therefore, rises upwardly through the treating vessel countercurrently to a descending body of solvent liquid. The light specific gravity phase accumulating in the top of the separating vessel, therefore, comprises the undissolved raffinate phase or paraffinic constituents of the oil mixed with some solvent liquid. The heavy specific gravity phase accumulating in the bottom of the separating vessel comprises the extract phase composed of the bulk of the solvent liquid containing the relatively non-paraffinic constituents of the oil dissolved in the solvent.

Where a solvent liquid mixture having a specific gravity lighter than the oil undergoing treatment is used, as in the case of a solvent mixture of methyl ethyl ketone and ethyl ether, the light specific gravity phase will comprise the extract phase composed of the bulk of the solvent containing dissolved constituents of the oil, while the heavy specific gravity phase will comprise the raffinate phase.

Similarly, in the dewaxing step, where a heavy specific gravity solvent mixture is employed, the light specific gravity phase accumulating in the top of the separating vessel will comprise paraffin wax in the form of a slurry mixed with some of the solvent liquid, while the heavy specific gravity phase accumulating in the bottom of the separating vessel comprises the dewaxed oil dissolved in the bulk of the solvent liquid.

One of the objects of my invention is to combine the extracting and dewaxing steps into a substantially unitary operation through the employment of the same solvents but in differing proportions in the successive steps. Thus, in the practice of my invention, the naphthenic or low viscosity index constituents of the oil may be separated first, after which the remaining raffinate is dewaxed in a succeeding step in the presence of a selective solvent composed in part of some of the solvent used in the preceding extracting step. The solvent liquids are mixed with the oil in proportions such that the mixture exerts a selective solvent action as between the naphthenic and paraffinic constituents of the oil. After removal of the separated naphthenic constituents, the raffinate phase which contains a substantial proportion of the separating solvent liquid is then mixed with a further quantity of the same solvent liquids in altered proportions so as to provide a mixture which will have selective action as between wax and oil at temperatures of around 0° F. and below.

For the purpose of further illustrating the invention, reference may now be made to the accompanying drawing showing a flow diagram for the process of this invention, adapted for the treatment of the wax-bearing lubricating oil fractions.

The wax-bearing oil to be treated is drawn from a storage tank 1 and conducted through a pipe 2 to a mixer 3, wherein it is mixed with the solvent liquid. The solvent liquid, which in this instance comprises a mixture composed of about 70% by volume of liquid sulphur dioxide and 30% by volume of orthodichlorbenzene, is drawn from the storage tank 4 by a pump 5, and delivered through a pipe 6 to the mixer 3.

The mixture of oil and solvent, after complete mixing in the mixer 3, is delivered to a chiller 7 wherein it is chilled to a temperature of around 0° F. The resulting cold mixture is then introduced to the lower portion of a separator vessel 8.

Solvent liquid from the tank 4, previously mentioned, is delivered by a pump through a chiller 9 and introduced to the upper portion of the separator 8 at a temperature of about 0° F. The solvent being introduced to the upper portion of the separator is also composed of a mixture of about 70% sulphur dioxide and 30% orthodichlorbenzene. The cold mixture of oil and solvent introduced to the lower portion of the separator 8 rises therethrough countercurrently to the descending body of solvent which is being introduced to the upper portion thereof. Intimate contact between the upper flowing body of oil and the downwardly flowing body of solvent is effected in a manner which will now be described in more detail.

The separator 8 advantageously comprises a vertical cylindrical vessel with its central portion divided into a series of mixing chambers 10. These mixing chambers are formed by a series of horizontal partitions 11 whose outer edges form a solid joint with the inner circumference of the cylindrical vessel. Each of these partitions is provided with a central aperture, each having tubular extensions 12 projecting above and below each partition.

A central shaft 13 extends through these apertures and is rotatably supported in the bottom and top, respectively, of the separator vessel 8.

Within each mixing section 10 of the separator vessel is an agitating and mixing element comprising a member 14 rigidly secured to the central shaft, and adapted to rotate with it, and a stationary cover member 15, and formed as shown.

The agitating member is such that during rotation of the central shaft 13, liquid is drawn into central annular openings in the cover member 15. The liquid thus drawn into the interior of the cover member 15 is thrown outwardly by centrifugal force against the inner wall and, as a consequence, is subjected to violent mixing.

After being discharged by the agitating element, this mixture undergoes separation into an upper layer comprising the liquid component of the mixture which is of light specific gravity, and a lower layer of liquid comprising a component which is of heavier specific gravity. The material of heavy specific gravity accumulates on the upper surface of each partition 11 and overflows therefrom into the upwardly projecting portion of the tubular extension 12, and from there flows downwardly into the next mixing section 10 below. Similarly, the material of light specific gravity, which accumulates below the under surface of each partition 11, flows into the downwardly projecting portion of each tubular extension 12, and from there flows upwardly into the next succeeding mixing section 10.

While the agitating means and its operation has been described in some detail, nevertheless it is understood that the invention is not restricted to any particular type of mixing or agitating means, and that other means of accomplishing satisfactorily complete mixing of the oil and solvent within the separator 8 may be used.

The purpose of the apparatus is to effect intimate countercurrent contact between the ascending body of oil and the descending body of solvent.

The separator vessel 8 is provided with ample space, both below the lowermost mixing section 10 and below the uppermost section, so as to provide for satisfactory settling. The liquid accumulating in the bottom of the separator 8 comprises naphthenic or low viscosity index constituents, so that the oil dissolved in the solvent liquid may be referred to as the extract phase. This extract phase material is drawn off through the pipe 20 provided with a seal 21 and a valve 22, from which it is discharged into tank 23 for such further treatment as may be desired.

The liquid accumulating in the upper portion of the separator 8 comprises the raffinate phase composed of the relatively paraffinic constituents of the oil which are of high viscosity index and which, of course, also includes wax constituents, all of which are insoluble in the solvent.

The valve 22, previously mentioned, is adjusted so as to maintain the proper distribution of liquids within the separator 8 so that a layer of separated paraffinic constituents and wax in the raffinate phase is maintained just above the outlet pipe 24. The excess separated hydrocarbons, including wax, are drawn off through this pipe 24 to a mixer 25, wherein they are mixed with an additional quantity of solvent drawn from a tank 26. This added solvent advantageously comprises a mixture consisting of about 25% by volume of liquid sulphur dioxide and 75% by volume of orthodichlorbenzene. It is mixed with the oil in a proportion of about one part of solvent mixture to one part of oil.

From the mixer 25 the oil and solvent is delivered to a chiller 27, wherein it is chilled to about −15° F. and from there introduced through a pipe 28 to the lower portion of the second separator 29. The separator 29 is similar to separator 8, previously described.

This mixture of oil and solvent introduced to the lower portion of the separator 29 rises upwardly through each of the mixing sections countercurrently to descending streams or body of solvent introduced to the upper portion of the separator 29. This latter solvent is introduced from a tank 30 and comprises a mixture consisting of about 30% by volume of sulphur dioxide and 70% by volume of orthodichlorbenzene. This solvent is conducted through a chiller 31, wherein it is cooled to about −18° F. prior to introduction to the upper portion of the separator 29.

Thus, the temperatures maintained within the separator 29 and the proportions of solvent employed are such that the wax constituents of the oil are separated from the mixture. The separated wax mixed with some of the solvent liquid accumulates in the upper portion of the separator 29, and is drawn off through a pipe 33, which may be provided with a helical screw conveyor adapted to facilitate withdrawing the waxy material into the tank 34.

The solution of oil in solvent liquid accumulating on the bottom of the separator 29 is withdrawn through a pipe 35 provided with a seal 36 and a valve 37. This solution may contain a small amount of solid material suspended therein, such as precipitated wax, and therefore the mixture can be conducted to a filter 36 of a Vallez type, for example.

The filter cake or solid material thus removed from the solution is drawn off to a tank 37, while the resultant filter comprising dewaxed raffinate is drawn off to a tank 38.

While a specific type of apparatus has been described for carrying out the process of my invention, it is to be understood that the invention is not restricted to the employment of any particular type of apparatus. It is contemplated, therefore, that other means for effecting intimate mixing between oil and solvent may be employed. Furthermore, the separating and dewaxing steps are not necessarily restricted to single treating vessels. Batch countercurrent as well as continuous countercurrent operations may be used.

Also where other solvents are used, different temperatures and proportions may be employed from those specified in the foregoing example.

The process of this invention is not limited to any particular type of hydrocarbon oil or petroleum fraction. It is adapted to the treatment of either distillate or residual fractions of petroleum and may thus include fractions other than lubricating oil stocks. While the invention has been described as adapted to the separation of wax from wax-bearing lubricating oil stocks, it is contemplated that it may also be employed for the separation of oil from petrolatum or other waxy concentrates for the purpose of producing a comparatively oil-free wax.

Moreover, as previously indicated, the invention is not restricted to any specific solvent or mixture of solvents. It is contemplated that other solvents, or mixed solvents, which possess a selective action as between constituents of the oil of differing viscosity index, or between solid and liquid constituents of the oil, may be used provided that the solvent, or mixed solvent, has a specific gravity differing sufficiently from that of the oil undergoing treatment so as to permit effective separation into phases within the separating vessel. In some instances, it may be desirable to employ mixtures of two or more solvents. For example, I have found that a mixture comprising 35% methyl ethyl ketone, 35% sulphur dioxide, and 30% orthodichlorbenzene may be used in the extracting step to separate the naphthenic constituents, while in the dewaxing step the mixture may comprise 18% acetone, 12% sulphur dioxide, and 70% orthodichlorbenzene.

Obviously, many modifications and variations of the invention, as hereinbefore set forth, may be made without departing from the spirit and scope thereof, and therefore only such limitations should be imposed as are indicated in the appended claims.

I claim:

1. A continuous method of separating wax and oil from wax-bearing oil wherein the wax-bearing oil and a selective dewaxing solvent are passed through a vertical countercurrent treating tower comprising a plurality of superimposed stages, and through which tower the wax constituents of the oil move countercurrently to the solvent, which comprises introducing the wax-bearing oil to the lower portion of said tower, introducing to the upper portion of said tower a solvent having the essential selective solvent action of a mixture composed of about 30% sulphur dioxide and 70% orthodichlorobenzene as between wax and oil at 0° F. and below and differing from the oil in specific gravity to substantially the same extent, maintaining the wax-bearing oil and solvent within the tower at a temperature of around 0° F. and below to form in each stage a wax phase relatively rich in wax and a solvent phase relatively lean in wax and relatively rich in oil, centrifugally disposing in the mid-portion of each stage a relatively thin horizontal stratum comprising a mixture of the wax phase from a preceding stage and the solvent phase from a succeeding stage moving in concurrent flow to the peripheral portion of each stage, subjecting the mixture of phases to gravity settling in said peripheral portion, with further separation into wax and solvent phases, respectively, discharging the resulting solvent phase to the preceding stage and the resulting wax phase to the succeeding stage, forming in the top of the tower a wax phase substantially free from oil, and in the bottom of the tower a solvent phase rich in oil and substantially free from wax and withdrawing said phases from the tower.

2. A continuous method of separating wax and oil from wax-bearing oil wherein the wax-bearing oil and a selective dewaxing solvent are passed through a vertical countercurrent treating tower comprising a plurality of superimposed stages, and through which tower the wax constituents of the oil move countercurrently to the solvent, which comprises introducing the wax-bearing oil to the lower portion of said tower, introducing to the upper portion of said tower a solvent mixture comprising about 30% sulphur dioxide and 70% orthodichlorbenzene, maintaining the wax-bearing oil and solvent within the tower at a temperature of around 0° F. and below to form in each stage a wax phase relatively rich in wax and a solvent phase relatively lean in wax and relatively rich in oil, centrifugally disposing in the mid-portion of each stage a relatively thin horizontal stratum comprising a mixture of the wax phase from a preceding stage and the solvent phase from a succeeding stage moving in concurrent flow to the peripheral portion of each stage, subjecting the mixture of phases to gravity settling in said peripheral portion, with further separation into wax and solvent phases, respectively, discharging the resulting solvent phase to the preceding stage and the resulting wax phase to the succeeding stage, forming in the top of the tower a wax phase substantially free from oil, and in the bottom of the tower a solvent phase rich in oil and substantially free from wax and withdrawing said phases from the tower.

3. A continuous method of separating wax and oil from wax-bearing oil wherein the wax-bearing oil and a selective dewaxing solvent are passed through a vertical countercurrent treating tower comprising a plurality of superimposed stages, and through which tower the wax constituents of the oil move countercurrently to the solvent, which comprises introducing the wax-bearing oil to the lower portion of said tower, introducing to the upper portion of said tower a solvent mixture comprising sulphur dioxide and chlorbenzene having a specific gravity of the order of about 1.34 and the chlorbenzene being in the predominant proportion such that the mixture exerts selective action as between wax and oil at 0° F. and below, maintaining the wax-bearing oil and solvent within the tower at a temperature of around 0° F. and below to form in each stage a wax phase relatively rich in wax and a solvent phase relatively lean in wax and relatively rich in oil, centrifugally disposing in the mid-portion of each stage a relatively thin horizontal stratum comprising a mixture of the wax phase from a preceding stage and the solvent phase from a succeeding stage moving in concurrent flow to the peripheral portion of each stage, subjecting the mixture of phases to gravity settling in said peripheral portion, with further separation into wax and solvent phases, respectively, discharging the resulting solvent phase to the preceding stage and the resulting wax phase to the succeeding stage, forming in the top of the tower a wax phase substantially free from oil, and in the bottom of the tower a solvent phase rich in oil and substantially free from wax and withdrawing said phases from the tower.

FRANCIS X. GOVERS.